US011734589B2

United States Patent
Yang et al.

(10) Patent No.: US 11,734,589 B2
(45) Date of Patent: Aug. 22, 2023

(54) VIRTUAL ASSISTANT NEGOTIATION SYSTEM AND METHOD THEREOF

(71) Applicant: Industrial Technology Research Institute, Hsin-Chu (TW)

(72) Inventors: Chi-Ta Yang, Hsinchu County (TW); Pei-Shu Huang, Tainan (TW); Te-Yu Liu, Hsinchu County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 805 days.

(21) Appl. No.: 16/575,811

(22) Filed: Sep. 19, 2019

(65) Prior Publication Data

US 2020/0143270 A1 May 7, 2020

Related U.S. Application Data

(60) Provisional application No. 62/756,793, filed on Nov. 7, 2018.

(30) Foreign Application Priority Data

Mar. 28, 2019 (TW) ................. 108110993

(51) Int. Cl.
*G06N 5/043* (2023.01)
*G06N 20/00* (2019.01)
*G06N 3/006* (2023.01)

(52) U.S. Cl.
CPC ............. *G06N 5/043* (2013.01); *G06N 3/006* (2013.01); *G06N 20/00* (2019.01)

(58) Field of Classification Search
None
See application file for complete search history.

(56) References Cited

U.S. PATENT DOCUMENTS 9,552,605 B2   1/2017  Caralis et al.
2013/0182963 A1*  7/2013  Cok ....................... G06V 20/30
                                         382/228
(Continued)

FOREIGN PATENT DOCUMENTS

CN   106845931   6/2017
CN   107169902   9/2017
(Continued)

OTHER PUBLICATIONS

Johnston M, Chen J, Ehlen P, Jung H, Lieske J, Reddy A, Selfridge E, Stoyanchev S, Vasilieff B, Wilpon J. Mva: The multimodal virtual assistant. In Proceedings of the 15th Annual Meeting of the Special Interest Group on Discourse and Dialogue (SIGDIAL) Jun. 2014 (pp. 257-259). (Year: 2014).*

(Continued)

*Primary Examiner* — Vincent Gonzales
(74) *Attorney, Agent, or Firm* — Wpat, P.C

(57) ABSTRACT

A virtual assistant negotiation method is provided, which includes the following steps: transmitting an event information by a first electronic device corresponding to an initiator; receiving a plurality of candidate projects generated by second electronic devices corresponding to a plurality of participants according to the event information by the first electronic devices; selecting a portion of the candidate projects to serve as recommended projects by the first electronic device of the host; and making a decision according to the opinions, for the recommended projects, corresponding to the main participant among the participants by the first electronic device.

20 Claims, 9 Drawing Sheets

(56) References Cited

U.S. PATENT DOCUMENTS

| | | | |
|---|---|---|---|
| 2014/0278676 A1* | 9/2014 | Burka | G06Q 10/1093 |
| | | | 705/7.19 |
| 2014/0310046 A1* | 10/2014 | Shidfar | G06Q 50/01 |
| | | | 705/7.19 |
| 2014/0337131 A1 | 11/2014 | Edara | |
| 2015/0379426 A1 | 12/2015 | Steele et al. | |
| 2017/0337498 A1 | 11/2017 | Rahimi et al. | |
| 2018/0251030 A9 | 9/2018 | Netzer | |
| 2018/0285465 A1 | 10/2018 | Schaffernoth et al. | |

FOREIGN PATENT DOCUMENTS

| | | |
|---|---|---|
| TW | I346904 | 8/2011 |
| TW | I490852 | 7/2015 |
| TW | I493485 | 7/2015 |
| TW | I515640 | 1/2016 |
| TW | I521467 | 2/2016 |
| TW | I557599 | 11/2016 |
| TW | 201828120 | 8/2018 |
| WO | WO2015188885 A1 | 12/2015 |

OTHER PUBLICATIONS

Heinberg, John Gilbert. "Theories of majority rule." American Political Science Review 26.3 (1932): 452-469. (Year: 1932).*

* cited by examiner

VIRTUAL ASSISTANT NEGOTIATION SYSTEM AND METHOD THEREOF

CROSS REFERENCE TO RELATED APPLICATION

All related applications are incorporated by reference. The present application is based on, and claims priority from, U.S. Provisional Application No. 62/756,793, filed on Nov. 7, 2018, and Taiwan Application No. 108110993, filed on Mar. 28, 2019, the disclosures of which are hereby incorporated by reference herein in their entirety.

TECHNICAL FIELD

The technical field relates to a negotiation system, in particular to a virtual assistant negotiation system. The technical field further relates to the virtual assistant negotiation method of the virtual assistant negotiation system.

BACKGROUND

With advance of technology, the techniques related to artificial intelligence (AI) are greatly improved. Virtual assistants are a kind of software agent, which can provide various services for users. For example, a virtual assistant can provide a lot of information, display music and videos, order food, provide shopping services, etc., for a user. Virtual assistants can make people's daily life more convenient; thus, it has become a development trend in the future to enhance the performance of virtual assistants. Currently, many manufacturers have invested a large amount of resources to develop the techniques related to virtual assistants.

Currently available virtual assistants can provide various services for users; however, when several users need to make a common decision, the currently available virtual assistants cannot provide a negotiation service for the users in order to make a common decision capable of satisfying their requirements.

Accordingly, it has become an important issue to improve the limits of the currently available virtual assistants.

SUMMARY

An exemplary embodiment of the disclosure relates to a virtual assistant negotiation system, which includes a first electronic device and a plurality of second electronic devices. The first electronic device is controlled by an initiator of an event, so is corresponding to an initiator. The first electronic device is configured to transmit an event information. The second electronic devices are corresponding to a plurality of participants and configured to receive the event information. Each of the second electronic devices is further configured to generate and transmit a plurality of candidate projects according to the event information. The first electronic device is further configured to receive the candidate projects and select at least one portion of the candidate projects to serve as recommended projects. Then, the first electronic device makes a decision according to the opinions provided by one of the second electronic devices for the recommended projects. The second electronic device is controlled by a main participant among the participants, so is corresponding to the main participant.

Another exemplary embodiment of the disclosure relates to a virtual assistant negotiation method, which includes the following steps: transmitting an event information by a first electronic device corresponding to an initiator; receiving a plurality of candidate projects generated by a plurality of second electronic devices, corresponding to a plurality of participants, according to the event information; selecting at least one portion of the candidate projects to serve as recommended projects by the first electronic device; and making a decision according to opinions, on the recommended projects, provided by the second electronic device corresponding to a main participant among the participants by the first electronic device.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

DETAILED DESCRIPTION

Figure 1:
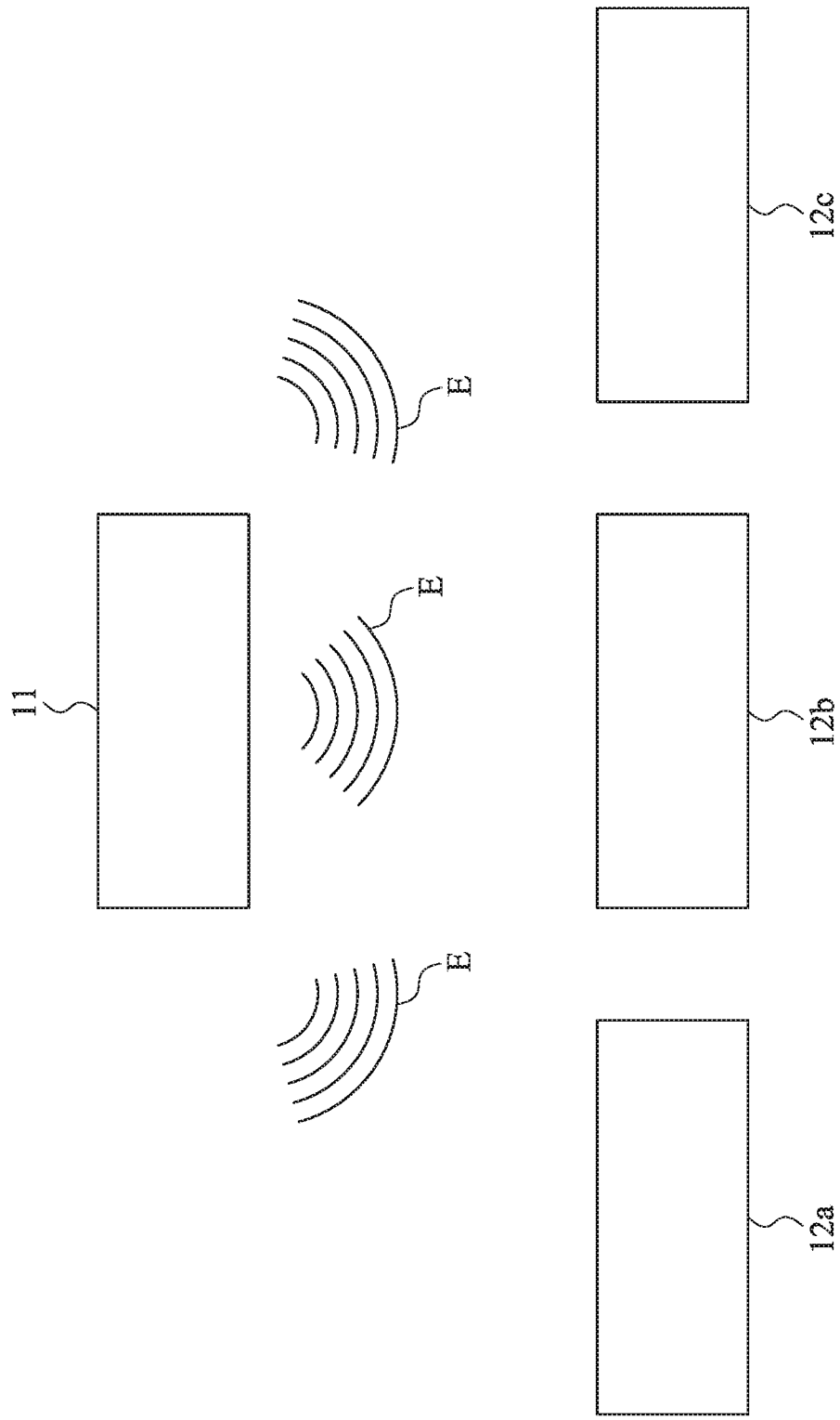
FIG. 1 is a schematic view of a virtual assistant negotiation system in accordance with a first exemplary embodiment of the disclosure.

In the following detailed description, for purposes of explanation, numerous specific details are set forth in order to provide a thorough understanding of the disclosed exemplary embodiments. It will be apparent, however, that one or more exemplary embodiments may be practiced without these specific details. In other instances, well-known structures and devices are schematically shown in order to simplify the drawing.

FIG. 1 is a first schematic view of a virtual assistant negotiation system in accordance with a first exemplary embodiment of the disclosure. As shown in FIG. 1, the virtual assistant negotiation system 1 includes a first electronic device 11 and a plurality of second electronic devices 12a, 12b, 12c.

The first electronic device 11 is controlled by an initiator of an event, so is corresponding to the initiator; the first electronic device 11 can execute a semantic analysis according to a proposal provided by the initiator in order to generate an event information E. More specifically, the event information E is obtained after the first electronic device 11 executes the semantic analysis to analyze the content of the initiator's proposal, and includes several types of information, such as who, what, when, where, which, budget, etc. Then, the first electronic device 11 obtains the participants involved in the event information E, the weight, corresponding to the event information E, of each the participant and the main participant (the second electronic device 12c) among the participants according to a group relationship table corresponding to the event information E. The aforementioned main participant is the necessary participant who can participate in the event information E. Afterwards, the first electronic device 11 transmits the event information E to the second electronic devices 12a, 12b, 12c in order to implement a negotiation process. In one exemplary embodiment, the first electronic device 11 and the second electronic devices 12a, 12b, 12c may be smart phones. In another exemplary embodiment, the first electronic device 11 and the second electronic devices 12a, 12b, 12c may be tablet computers, notebook computers or other electronic devices.

Besides, the aforementioned group relationship table and the weights, corresponding to the event information E, of the participants can be obtained by data collection and data analysis during a period of time. Different events may concern different groups. For example, if an event concerns the company that the initiator works for, the corresponding group relationship table may include the initiator's colleagues, supervisors, etc. Similarly, if an event concerns the initiator's family, the corresponding group relationship table may include the initiator's parents, brothers, sisters and other relatives. In addition, different participants may have different weights in the event information E. For instance, if the event information E concerns selecting a restaurant and the above data collection/data analysis show that one of the participants often has negative opinions on selecting the restaurant, the weight of the participant in the event information E will be higher. On the contrary, if another participant often has no opinion on selecting the restaurant, the weight of the participant in the event information E will be lower. The above weight can be calculated by Equation (1), as follows:

$$W_{ik}^{type} = \frac{T_{ik}^{item}}{\sum_{k=1}^{n} T_{ik}^{item}} \quad (1)$$

In Equation (1), $W_{ik}^{type}$ stands for the weight, corresponding to the object category k, of the participant i; $T_{ik}^{item}$ stands for the total number of the objects belonging to the object category k of the participant i.

For example, when the initiator provides a proposal "a birthday party for a colleague in the company", the first electronic device 11 executes a semantic analysis to analyze the proposal "a birthday party for a colleague in the company". Then, the first electronic device 11 generates one or more of the information, who, what, when, where, which, budget, etc., according to the result of the semantic analysis to serve as the event information E "Company—Birthday party". Afterwards, the first electronic device 11 obtains the participants (i.e. colleagues, supervisors, etc.) involved in the event information E, the weight, corresponding to the event information E, of each participant and the main participant (the birthday party is held for the person) among the participants according to a group relationship table corresponding to the event information E. The main participant is the necessary person, among the participants, who can participate in the event information E "Company—Birthday party". As described above, the first electronic device 11 can generate an event corresponding to a proposal provided by the initiator, such as "Company—Trade exhibition", "College—Class reunion", "Family—Dinner party", etc.

Figure 2:
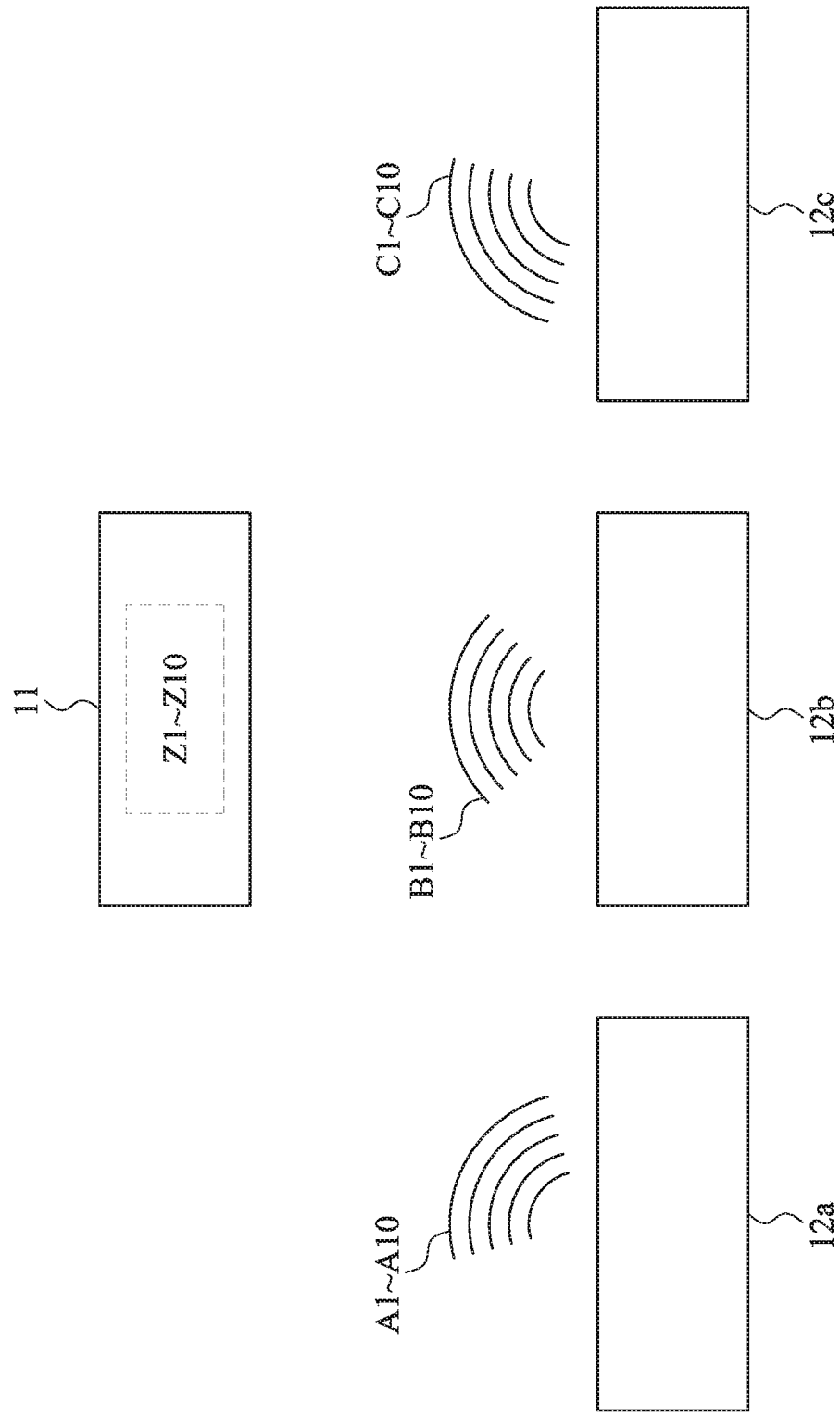
FIG. 2 is a schematic view of a virtual assistant negotiation system in accordance with the first exemplary embodiment of the disclosure.

FIG. 2 is a second schematic view of a virtual assistant negotiation system in accordance with a first exemplary embodiment of the disclosure. As shown in FIG. 2, the second electronic devices 12a, 12b, 12c are corresponding to the participants respectively. The second electronic device 12a generates and transmits a plurality of candidate projects A1-A10 to the first electronic device 11 according to the event information E. The second electronic device 12b generates and transmits a plurality of candidate projects B1-B10 to the first electronic device 11 according to the event information E. Similarly, the second electronic device 12c generates and transmits a plurality of candidate projects C1-C10 to the first electronic device 11 according to the event information E.

In the exemplary embodiment, the second electronic devices 12a, 12b, 12c generate the candidate projects according to the event information E respectively. More specifically, the second electronic devices 12a, 12b, 12c generates the candidate projects by searching according to the event information E. In other words, the second electronic devices 12a, 12b, 12c can generate plural keywords by combining the information "who, what, when, where, which and budget" in different ways and search the Internet by these keywords so as to generate these candidate projects. In another exemplary embodiment, the second electronic devices 12a, 12b, 12c can further generate plural keywords according to the information, related to "who, what, when, where, which and budget", provided by the personal models of the participants. For instance, if the event information E lacks some of the information "who, what, when, where, which and budget" (e.g. the event information E lacks the information of "when and where"), the second electronic devices 12a, 12b, 12c can supplement the above insufficient information via the personal models of the participants so as to generate the candidate projects. The aforementioned personal models are generated by the training process according to the historical records and the acceptances of the participants. For instance, if the historical record and the acceptance of the participant corresponding to the second electronic device 12a show that the participant has a preference for some restaurants, time periods and meals, these restaurants, time periods and meals will be included in the personal model of the participant.

Similarly, the first electronic device 11 generates a plurality of candidate projects Z1-Z10 by searching the Internet by plural keywords. The keywords are generated by combining the information "who, what, when, where, which and budget" provided by the event information E in different ways. If the event information E lacks some of the information "who, what, when, where, which and budget", the first electronic device 11 can also supplement the above insufficient information via the personal model of the initiator so as to generate the candidate projects of the initiator.

After the candidate projects are generated, each of the second electronic devices 12a, 12b, 12c further calculates the acceptance of each of its own candidate projects. The acceptance of each candidate project can be calculated according to Equation (2), as follows:

$$P_{ij}^{avg} = \frac{\sum_{i=1}^{n} P_{ij}^{l}}{n} \quad (2)$$

In Equation (2), $P_{ij}^{avg}$ stands for the average acceptance (between 0-5) of the initiator and each participant i for the object j; n stands for the total amount of the acceptance records of the object j of the initiator and each participant i; $P_{ij}^{l}$ stands for the acceptance (between 0-5) of the initiator and each participant i for the first piece of data of the object j.

Figure 3:
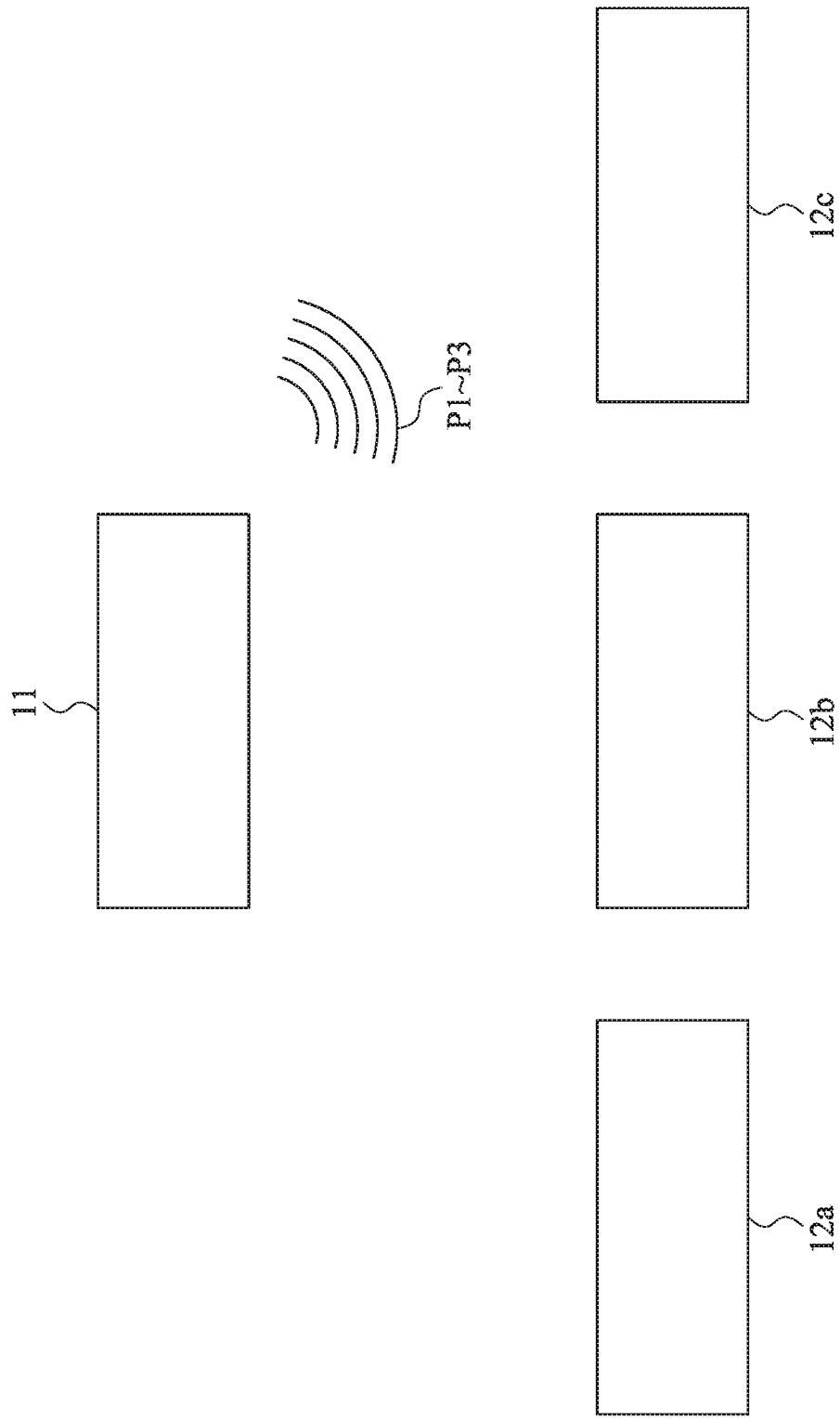
FIG. 3 is a schematic view of a virtual assistant negotiation system in accordance with the first exemplary embodiment of the disclosure.
Figure 4:
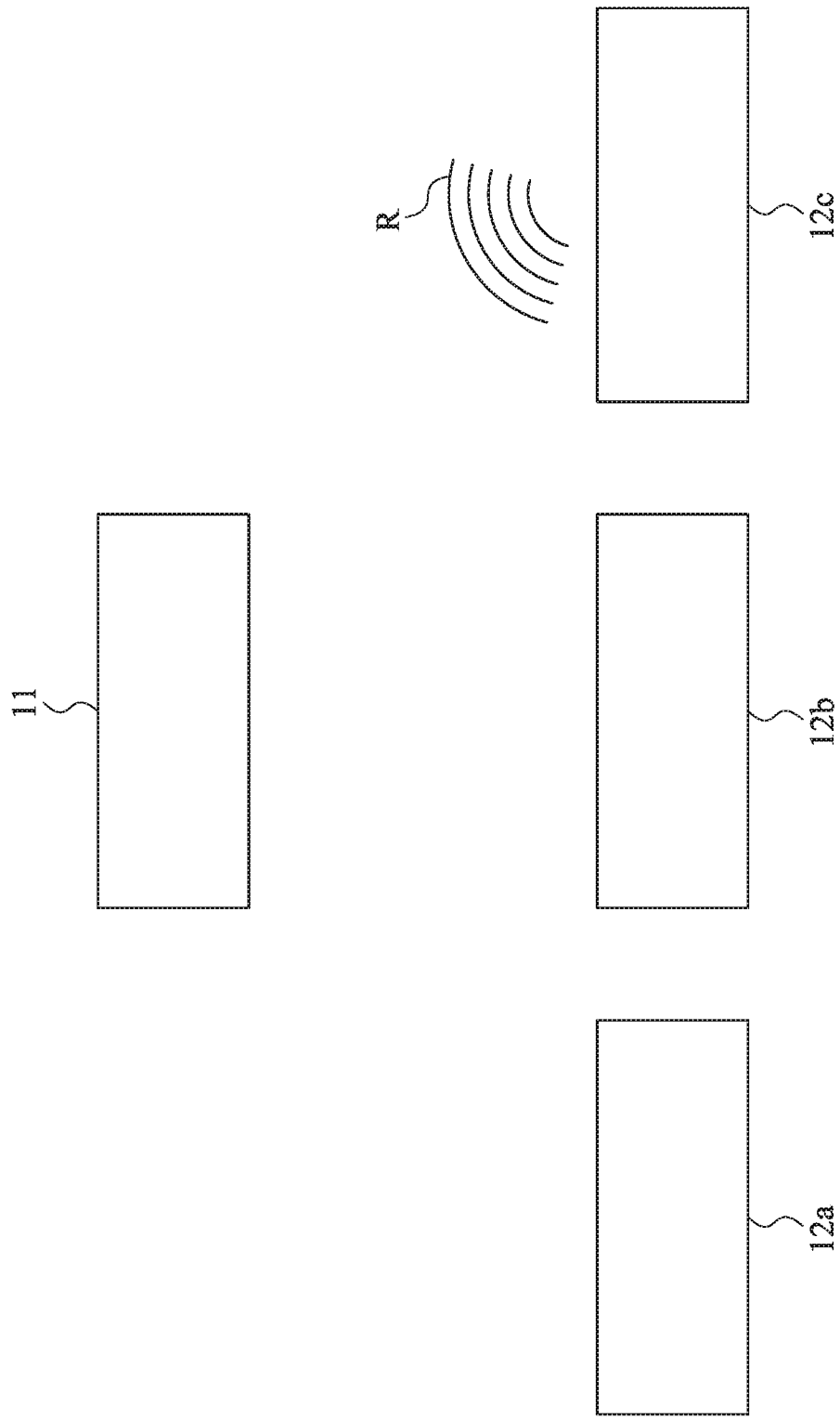
FIG. 4 is a schematic view of a virtual assistant negotiation system in accordance with the first exemplary embodiment of the disclosure.

FIG. 3 and FIG. 4 are a third schematic view and a fourth schematic view of a virtual assistant negotiation system in accordance with a first exemplary embodiment of the disclosure. As shown in FIG. 3, the first electronic device 11 selects a portion of the candidate projects A1-A10, B1-B10, C1-C10, Z1-Z10 to generate a plurality of recommended projects P1-P3, and transmits the recommended projects P1-P3 to the second electronic device 12c corresponding to the main participant. Then, the main participant can make a determination, and provide the opinions on whether to agree the recommended projects P1-P3 via the second electronic device 12c to the first electronic device 11. As shown in FIG. 4, the main participant transmits the opinions R on the recommended projects P1-P3 via the second electronic device 12c in order to make a decision. In addition, the first electronic device 11 can ask the main participant for his/her opinions according to the sequence of the recommended projects P1-P3 so as to understand whether the main participant agrees the recommended projects P1-P3 or not.

More specifically, the first electronic device 1 can calculate a plurality of recommendation scores corresponding to the candidate projects respectively according to the weight, corresponding to the event information E "Company—Birthday party", of the initiator and each the participant, and the acceptance, corresponding to each the candidate project, of each the participant. The aforementioned acceptance can be calculated according to Equation (3), as follows:

$$A_i = \frac{\sum_{j=1}^{n} W_{ik}^{type} \times P_{ij}^{avg}}{A_i^{max}} \quad (3)$$

In Equation (3), $A_i$ stands for the normalized acceptance of the initiator or each participant i for the candidate project; $W_{ik}^{type}$ stands for the weight of the initiator or each participant in the object category k; $P_{ij}^{avg}$ stands for the average acceptance (between 0-5) of the initiator or each participant i for the object j; $A_i^{max}$ stands for the maximal value of the acceptances of the initiator or each participant i for all candidate projects.

The aforementioned recommendation score can be calculated according to Equation (4), as follows:

$$R_i = \sum_{j=1}^{n} W_{je}^{user} \times A_i \quad (4)$$

In Equation (4), $R_i$ stands for the recommendation score of the candidate project; $W_{je}^{user}$ stands for the weight of the initiator or the participant i in the event information E; $A_i$ stands for the normalized acceptance of the initiator or the participant i for the candidate project. As shown in Equation (4), if more than one of the participants and the initiator provide the same candidate project, the recommendation score of the candidate project may be higher than the others, so the candidate project is more likely to become one of the recommended projects P1-P3.

Then, the first electronic device 11 sequences the candidate projects A1-A10, B1-B10, C1-C10, Z1-Z10 according to the recommendation scores thereof, and selects a predetermined number of the candidate projects with higher sequence to serve as the recommended projects P1-P3. In the exemplary embodiment, there are 40 candidate projects in total and the first electronic device 11 the top 3 of the candidate projects with high sequence to serve as the recommended projects P1-P3.

Figure 5:
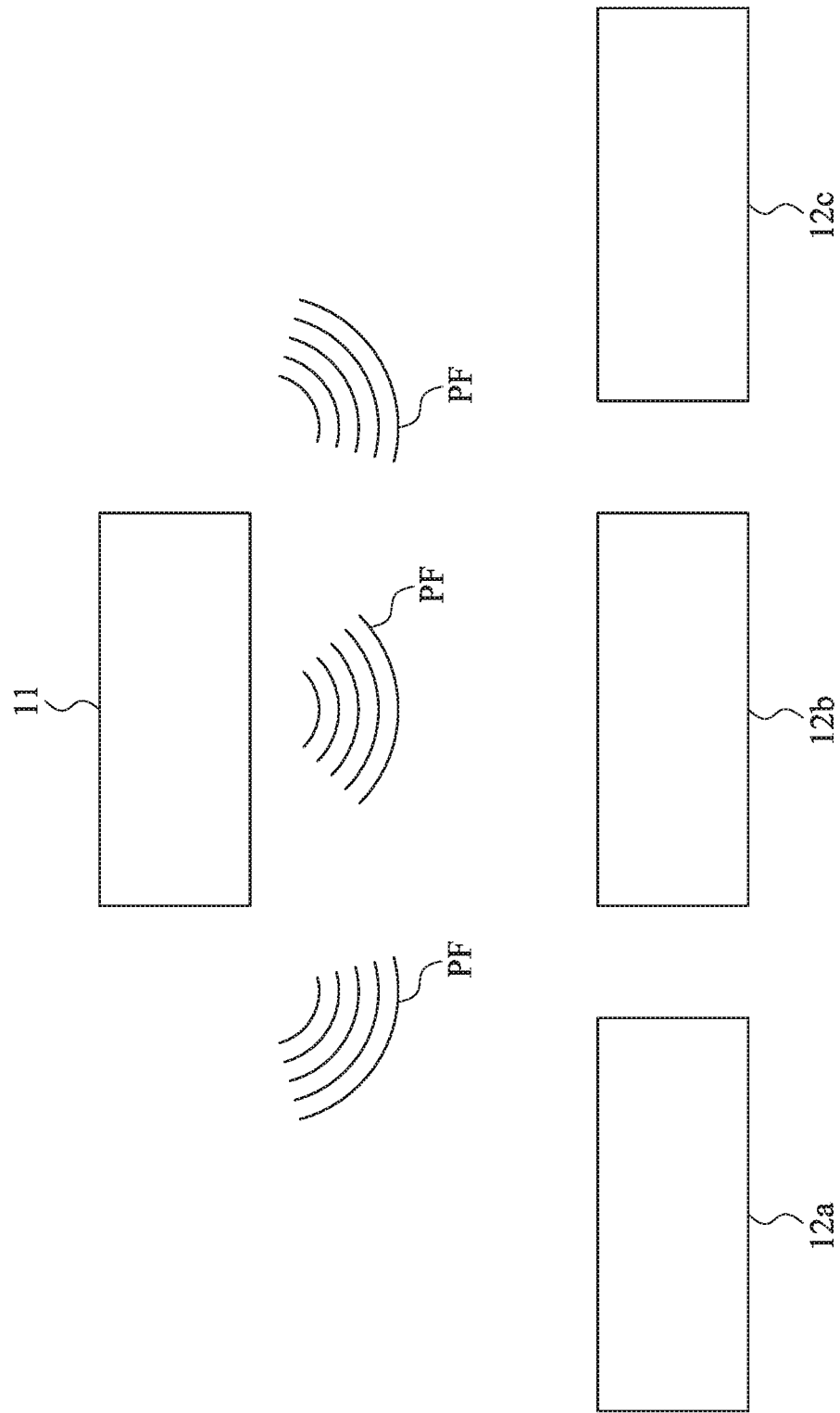
FIG. 5 is a schematic view of a virtual assistant negotiation system in accordance with the first exemplary embodiment of the disclosure.

FIG. 5 is a fifth schematic view of a virtual assistant negotiation system in accordance with a first exemplary embodiment of the disclosure. As shown in FIG. 5, for example, if the sequence of the recommended projects P1-P3 is recommended project P1→recommended project P2→recommended project P3, the first electronic device 11 asks the main participant for his/her opinion in order to understand whether the main participant agrees the recommended project P1. When the main participant provides his/her opinion to opposes the recommended project P1 via the second electronic device 12c to the first electronic device 11, the first electronic device 11 asks the main participant for his/her opinion in order to understand whether the main participant agrees the recommended project P2. When the main participant provides his/her opinion to opposes the recommended project P2 via the second electronic device 12c to the first electronic device 11, the first electronic device 11 asks the main participant for his/her opinion in order to understand whether the main participant agrees the recommended project P3. When the main participant provides his/her opinion to oppose the recommended project P3 via the second electronic device 12c to the first electronic device 11, the first electronic device 11 re-executes the negotiation process. In the next negotiation process, the first electronic device 11 will directly remove the recommended projects P1-P3 so as to increase the opportunity of successfully making a decision. On the contrary, when the main participant provides his/her opinion to agree any one of the recommended projects P1-P3 via the second electronic device 12c to the first electronic device 11, the first electronic device 11 selects the recommended project to serve as a final project PF, and transmits the final project PF to the second electronic devices 12a, 12b, 12c. Afterwards, the first electronic device 11 takes the final project PF to be the common decision of the group. The first electronic device 11 may connect to a reservation service platform (e.g., OpenTable or Bookatable) and forward the final project PF to the reservation service platform via application programming interface to make a reservation for the final project PF.

As described above, the virtual assistant negotiation system 1 can sequence the candidate projects A1-A10, B1-B10, C1-C10, Z1-Z10 according to the weights, corresponding to the event information E, of the initiator and the participants, and the acceptances of the participants for these candidate projects in order to generate plural recommended projects P1-P3. Then, the virtual assistant negotiation system 1 can make a decision according to the opinions of the main participant among the participants. Accordingly, although the virtual assistant negotiation system 1 takes into account the opinions of all participants, the main participant still keeps the right to make the final decision. In this way, the common decision provided by the virtual assistant negotiation system 1 can conform to the decision making mechanism of the human society to the most degree.

In addition, the virtual assistant negotiation system 1 can generate the recommended projects P1-P3 according to the group relationship table corresponding to the event information E "Company—Birthday party", the weights, corresponding to the event information E "Company—Birthday party", of the initiator and the participants, and the acceptances of the participants for all candidate projects A1-A10, B1-B10, C1-C10, Z1-Z10. Accordingly, the virtual assistant negotiation system 1 can take into account the relationships between the people in the group and the opinions of all participants, so can provide a common decision capable of satisfying the requirements, and meet the consensus of all participants to the most degree. As described above, the virtual assistant negotiation system 1 can actually achieve great performance.

It is worthy to point out that currently available virtual assistants can provide various services for plural users, but cannot provide a negotiation service for them to make a common decision capable of satisfying their requirements when they need to make a common decision. On the contrary, according to one exemplary embodiment of the disclosure, the virtual assistant negotiation system has a special operational mechanism, which can provide a common decision regarding an event information for a group including plural participants. Therefore, the performance of the virtual assistant negotiation system according to the exemplary embodiment of the disclosure can be enhanced.

In addition, according to one exemplary embodiment of the disclosure, the virtual assistant negotiation system can take into account the relationships between the people in a group and the opinions of all participants in the group, so can provide a common decision which can satisfy the requirements and meet the consensus of all participants to the most degree.

Further, according to one exemplary embodiment of the disclosure, the virtual assistant negotiation system can sequence candidate projects and generate a plurality of recommended projects according to the weight, corresponding to the event information, of each participant and the acceptance, corresponding to each candidate project, of each participant. Then, the virtual assistant negotiation system can make a decision according to the opinions, for the recommended projects, of the main participant among the participants. Therefore, the common decision provided by the virtual assistant negotiation system can conform to the decision making mechanism of the human society to the most degree.

Moreover, according to one exemplary embodiment of the disclosure, the virtual assistant negotiation system can keep modifying the weight, corresponding to the event information, of each participant according to the participant's opinion for the event information. Therefore, the performance of the virtual assistant negotiation system can be continuously optimized in order to provide the best common decision.

Furthermore, according to one exemplary embodiment of the disclosure, the virtual assistant negotiation system not only can search various information for a user, but also can provide a common decision for a group including plural participants. Accordingly, the application of the virtual assistant negotiation system can be more comprehensive.

Figure 6:
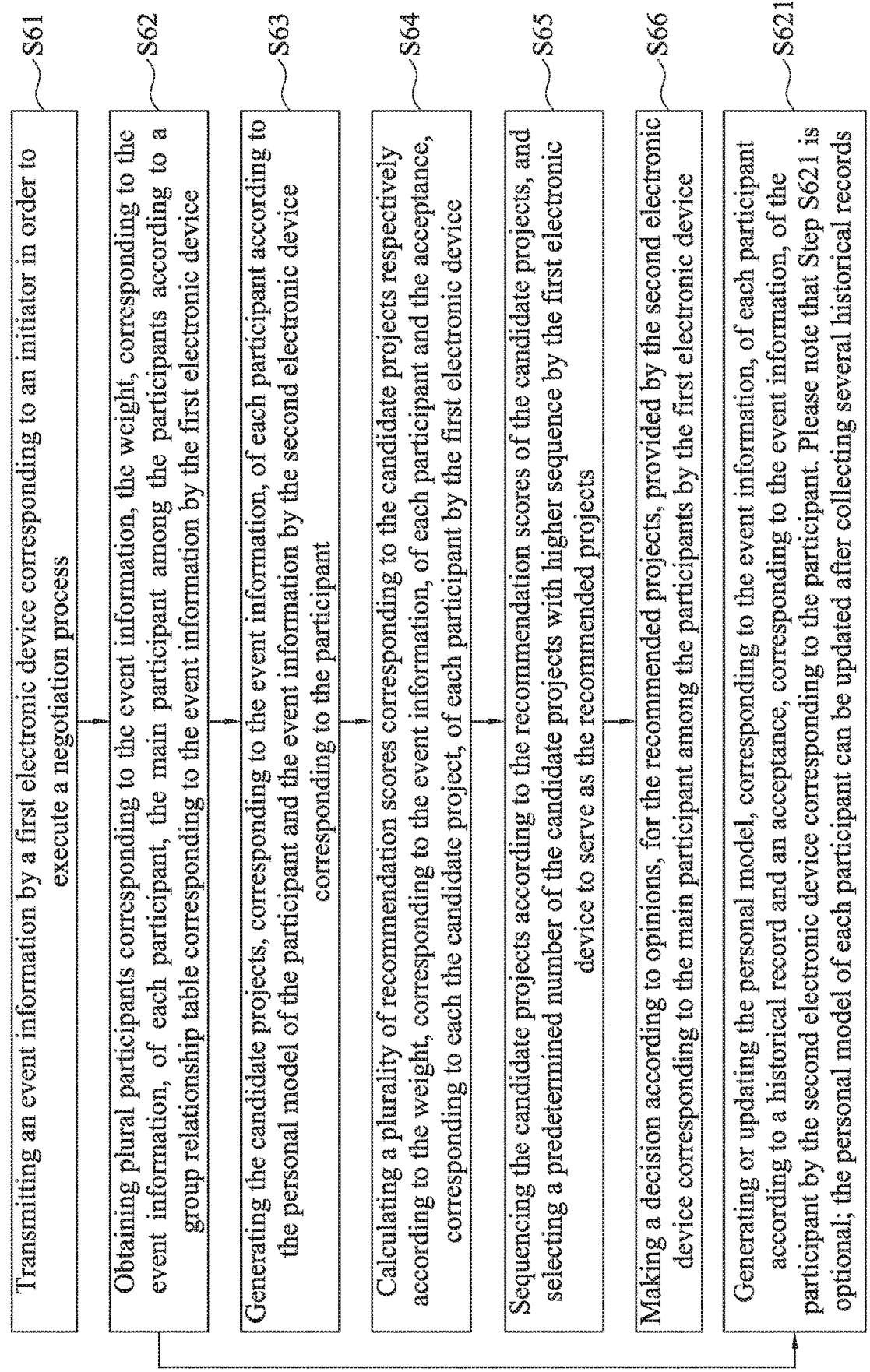
FIG. 6 is a flow chart of the first exemplary embodiment of the disclosure.

FIG. 6 is a flow chart of the first exemplary embodiment of the disclosure. As shown in FIG. 6, the virtual assistant negotiation method of the virtual assistant negotiation system 1 includes the following steps:

Step S61: a first electronic device corresponding to an initiator transmits an event information to execute a negotiation process.

Step S62: the first electronic device obtains plural participants corresponding to the event information, the weight, corresponding to the event information, of each participant, the main participant among the participants according to a group relationship table corresponding to the event information.

Step S621: the second electronic device corresponding to each participant generates or updates the personal model, corresponding to the event information, of the participant according to a historical record and an acceptance, corresponding to the event information, of the participant. Please note that Step S621 is optional; the personal model of each participant can be updated after collecting a lot of pieces of historical records.

Step S63: the second electronic device corresponding to each participant generates the candidate projects, corresponding to the event information, of the participant according to the personal model of the participant and the event information.

Step S64: the first electronic device calculates a plurality of recommendation scores corresponding to the candidate projects respectively according to the weight, corresponding to the event information, of each participant and the acceptance, corresponding to each the candidate project, of each participant.

Step S65: the first electronic device sequences the candidate projects according to the recommendation scores of the candidate projects, and selects a predetermined number of the candidate projects with higher sequence to serve as the recommended projects.

Step S66: the first electronic device makes a decision according to opinions, for the recommended projects, provided by the second electronic device corresponding to the main participant among the participants.

The exemplary embodiment just exemplifies the disclosure and is not intended to limit the scope of the disclosure. Any equivalent modification and variation according to the spirit of the disclosure is to be also included within the scope of the following claims and their equivalents.

Figure 7:
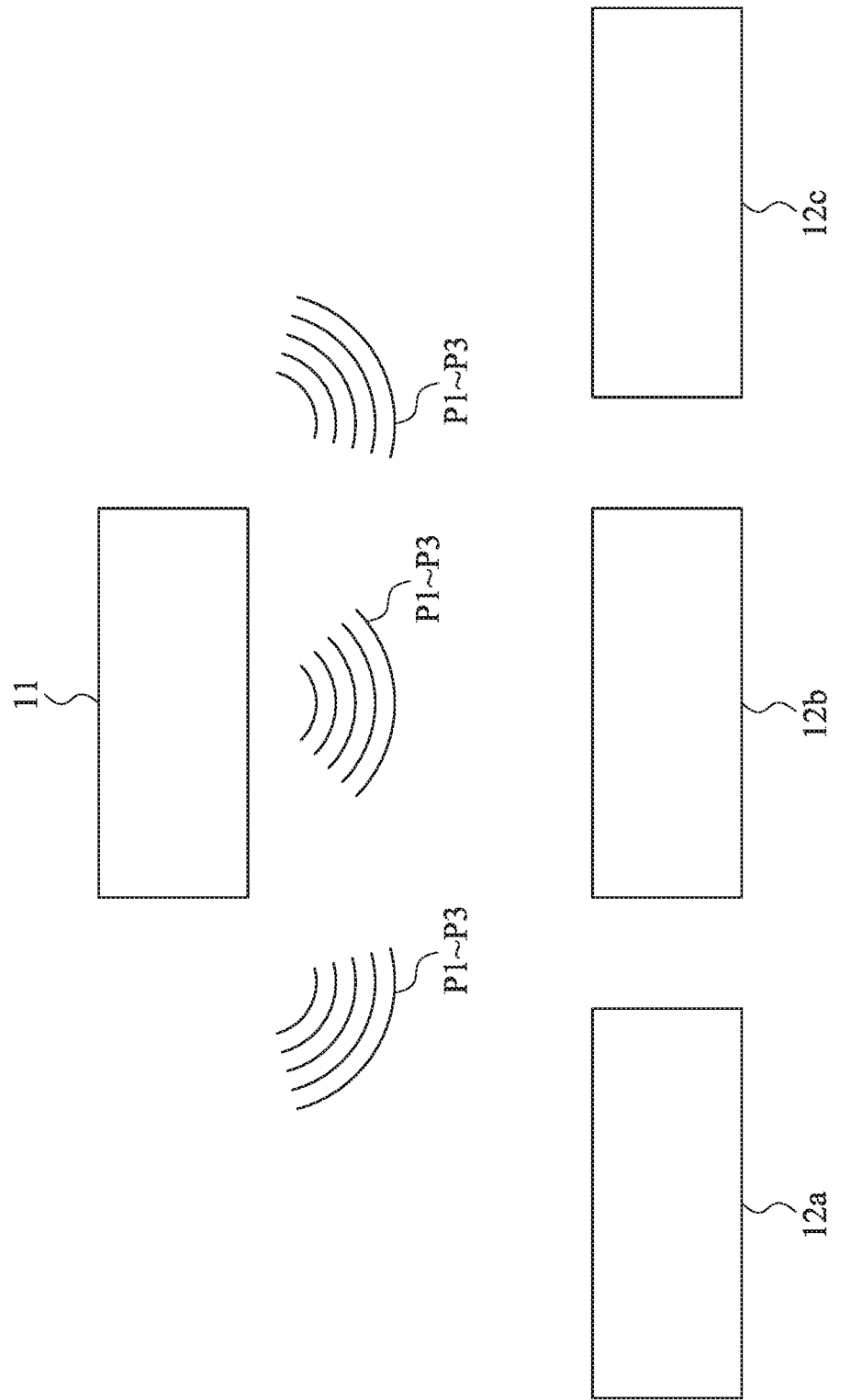
FIG. 7 is a schematic view of a virtual assistant negotiation system in accordance with a second exemplary embodiment of the disclosure.

FIG. 7 is a first schematic view of a virtual assistant negotiation system in accordance with a second exemplary embodiment of the disclosure. As shown in FIG. 7, the virtual assistant negotiation system 1 includes a first electronic device 11 and a plurality of second electronic devices 12a, 12b, 12c.

The first electronic device 11 is corresponding to an initiator of an event; the first electronic device 11 can execute a semantic analysis according to a proposal provided by the initiator in order to generate an event information. The event information includes several types of information, such as who, what, when, where, which, budget, etc. Then, the first electronic device 11 obtains the participants involved in the event information, the weight, corresponding to the event information, of each the participant and the main participant among the participants according to a group relationship table corresponding to the event information.

The second electronic devices 12a, 12b, 12c are corresponding to the participants respectively. Similarly, the second electronic devices 12a, 12b, 12c generate and transmit a plurality of candidate projects, corresponding to the event information, to the first electronic device 11 according to the event information and the personal models of the participants.

Next, the first electronic device 11 generates a plurality of candidate projects P1-P3 via the method the same with that of the previous exemplary embodiment.

The detailed steps of the negotiation process of this exemplary embodiment is the same with that of the previous exemplary embodiment, so will not be described herein again. The difference between this exemplary embodiment and the previous exemplary embodiment is that the first electronic device 11 can further simultaneously transmit the recommended projects P1-P3 to the second electronic devices 12a, 12b, 12c, and ask the second electronic devices 12a, 12b, 12c corresponding to the participants for their opinions according to the sequence of the recommended projects P1-P3.

Figure 8:
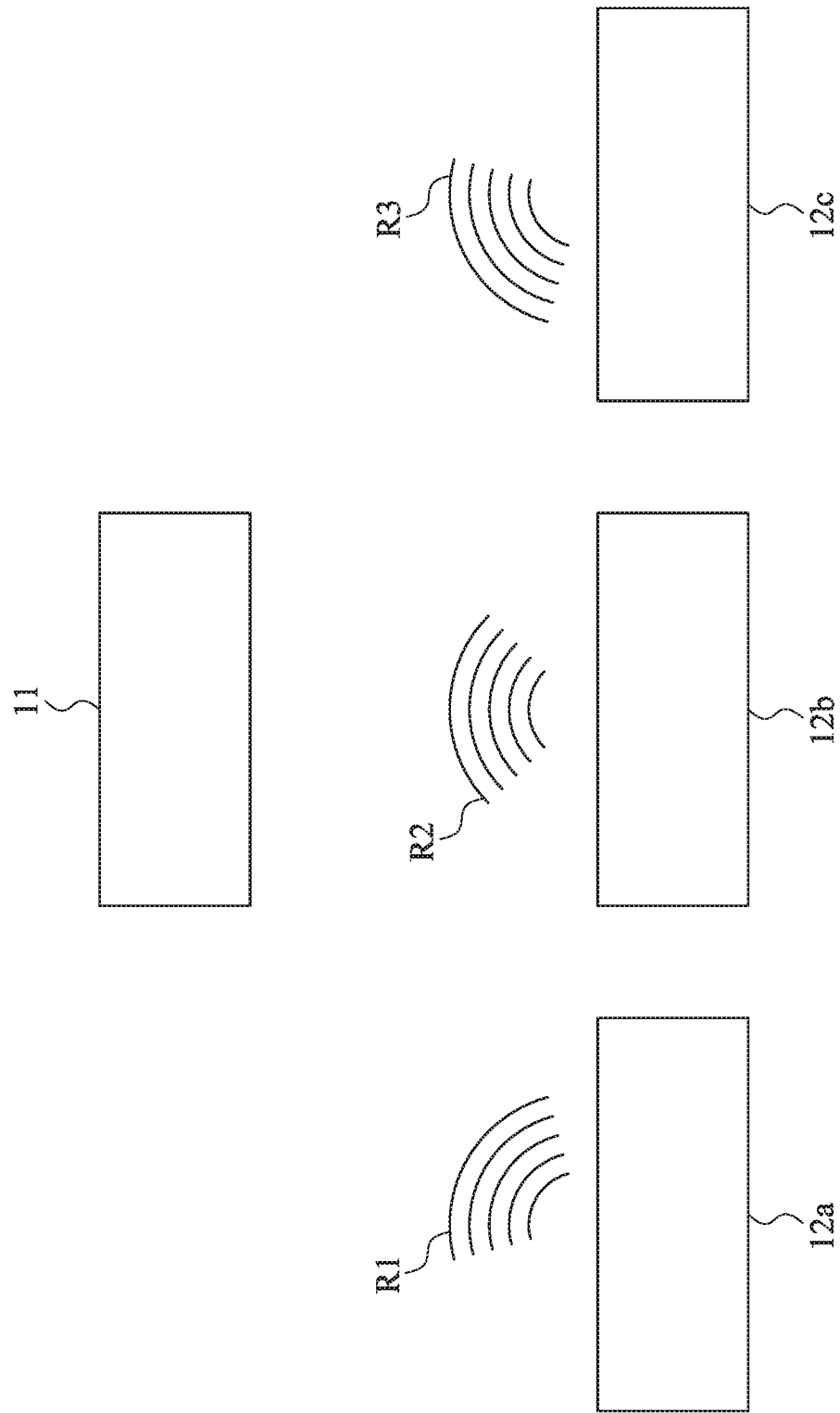
FIG. 8 is a schematic view of a virtual assistant negotiation system in accordance with the second exemplary embodiment of the disclosure.

FIG. 8 is a second schematic view of a virtual assistant negotiation system in accordance with a second exemplary embodiment of the disclosure. As shown in FIG. 8, the second electronic devices 12a, 12b, 12c transmit the opinions R1-R3 of the participants to the first electronic device 11 respectively. Then, the first electronic device 11 modifies the weights of the participants in the event information according to the opinions R1-R3 of the participants so as to update the group relationship table of the event information.

For example, when one of the participants opposes the recommended projects P1-P3 to the first electronic device 11, the first electronic device 11 increases the weight of the participant in the event information so as to update the group relationship table of the event information. In this way, if another event similar to this event occurs, the candidate projects provided by this participant will be more likely to be selected as the recommended projects P1-P3. On the contrary, when the participant agrees the recommended projects P1-P3 or does not provide any opinion on the recommended projects P1-P3, the first electronic device 11 decreases the weight of the participant in the event information so as to update the group relationship table of the event information. Therefore, if another event similar to this event occurs, the candidate projects provided by this participant will have low priority to be chosen as the recommended projects P1-P3.

As described above, the virtual assistant negotiation system 1 not only can provide a common decision for a group including plural participants, but also can keep modifying the weights of the participants in an event information according to the participants' opinions on the event information. Accordingly, the virtual assistant negotiation system 1 can continuously update the group relationship table of the event information and keep optimizing the performance of the virtual assistant in order to provide a best common decision.

Figure 9:
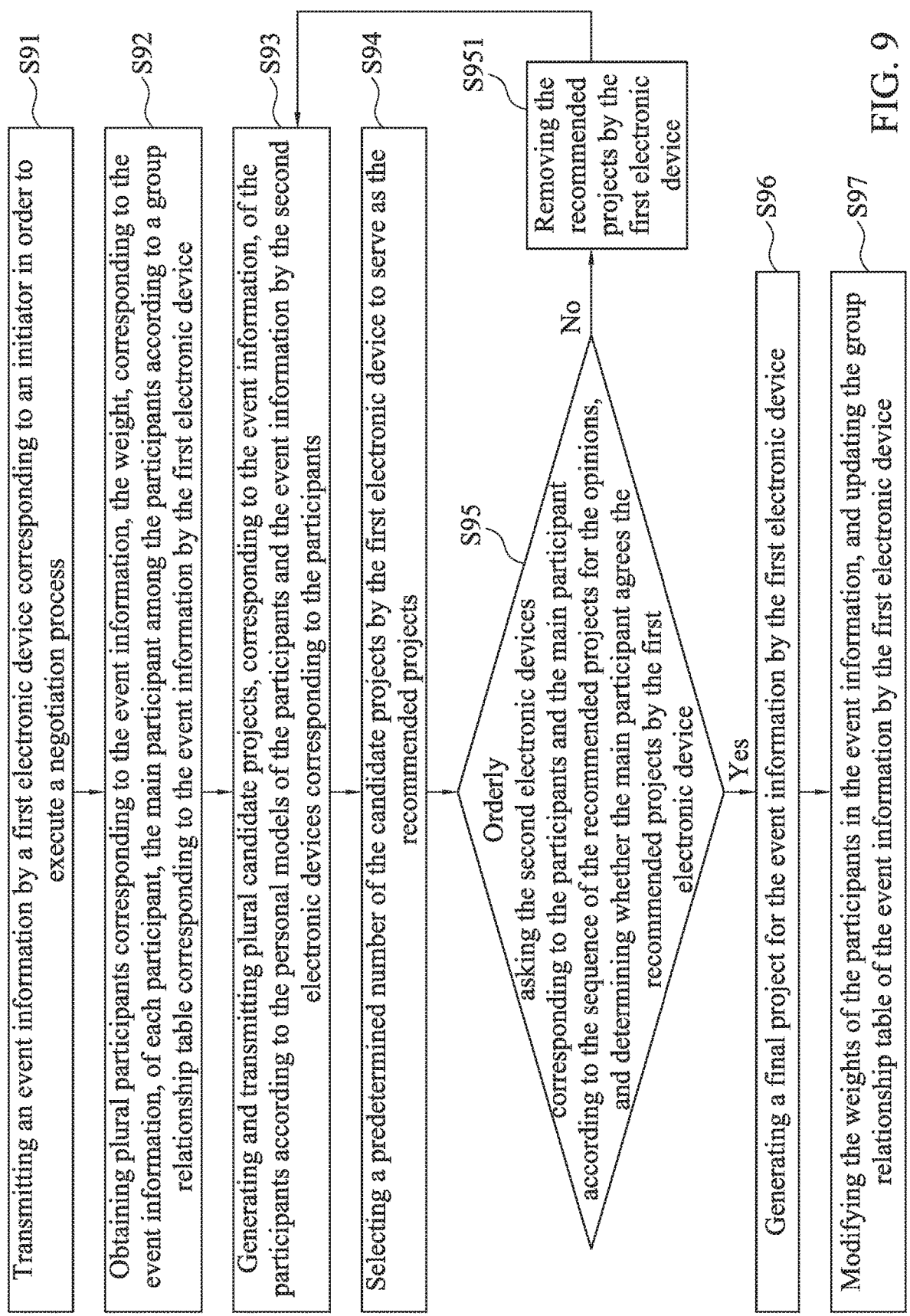
FIG. 9 is a flow chart of the second exemplary embodiment of the disclosure.

FIG. 9 is a flow chart of the first exemplary embodiment of the disclosure. As shown in FIG. 9, the virtual assistant negotiation method of the virtual assistant negotiation system 1 includes the following steps:

Step S91: transmitting an event information by a first electronic device corresponding to an initiator in order to execute a negotiation process. Then, the process proceeds to Step S92.

Step S92: obtaining plural participants corresponding to the event information, the weight, corresponding to the event information, of each participant, the main participant among the participants according to a group relationship table corresponding to the event information by the first electronic device. Then, the process proceeds to Step S93.

Step S93: generating and transmitting plural candidate projects, corresponding to the event information, of the participants according to the personal models of the participants and the event information by the second electronic devices corresponding to the participants. Then, the process proceeds to Step S94.

Step S94: selecting a predetermined number of the candidate projects by the first electronic device to serve as the recommended projects. Then, the process proceeds to Step S95.

Step S95: orderly asking the second electronic devices corresponding to the participants and the main participant according to the sequence of the recommended projects for the opinions, and determining whether the main participant agrees the recommended projects by the first electronic device. When the main participant agrees the recommended projects, the process proceeds to Step S96; when the main participant does not agree the recommended projects, the process proceeds to Step S951.

Step S951: removing the recommended projects by the first electronic device. Then, the process returns to Step S93.

Step S96: generating a final project for the event information by the first electronic device. Then, the process proceeds to Step S97.

Step S97: modifying the weights of the participants in the event information, and updating the group relationship table of the event information.

In summation of the description above, according to one exemplary embodiment of the disclosure, the virtual assistant negotiation system has a special operational mechanism, which can provide a common decision regarding an event information for a group including plural participants. Therefore, the performance of the virtual assistant negotiation system can be enhanced.

In addition, according to one exemplary embodiment of the disclosure, the virtual assistant negotiation system can take into account the relationships between the people in a group and the opinions of all participants in the group, so can provide a common decision which can satisfy the requirements, and meet the consensus of all participants to the most degree.

Further, according to one exemplary embodiment of the disclosure, the virtual assistant negotiation system can sequence candidate projects, and generate a plurality of recommended projects according to the weight, corresponding to the event information, of each participant and the acceptance, corresponding to each candidate project, of each participant. Then, the virtual assistant negotiation system can make a decision according to the opinions, for the recommended projects, of the main participant among the participants. Therefore, the common decision provided by the virtual assistant negotiation system can conform to the decision making mechanism of the human society to the most degree.

Moreover, according to one exemplary embodiment of the disclosure, the virtual assistant negotiation system can keep modifying the weight, corresponding to the event information, of each participant according to the participant's opinion for the event information. Therefore, the performance of the virtual assistant negotiation system can be continuously optimized in order to provide the best common decision.

Furthermore, according to one exemplary embodiment of the disclosure, the virtual assistant negotiation system not only can search various information for a user, but also can provide a common decision for a group including plural participants. Accordingly, the application of the virtual assistant negotiation system can be more comprehensive.

It will be apparent to those skilled in the art that various modifications and variations can be made to the disclosed exemplary embodiments. It is intended that the specification and examples be considered as exemplary only, with a true scope of the disclosure being indicated by the following claims and their equivalents.

What is claimed is:

1. A virtual assistant negotiation system, comprising:
a first electronic device, corresponding to an initiator and configured to transmit an event information, and obtain a plurality of participants corresponding to the event information, a weight corresponding to each of the participants in the event information, and a main participant from among the participants according to a group relationship table corresponding to the event information, wherein the weight corresponding to each of the participants varies with different event information;

a plurality of second electronic devices, corresponding to the participants and configured to receive the event information, wherein each of the second electronic devices is further configured to generate and transmit a plurality of candidate projects according to the event information;

wherein the first electronic device is further configured to receive the candidate projects from each of the second electronic devices, select at least one portion of the candidate projects to serve as recommended projects and make a decision for each of the recommended projects according to an input provided by the second electronic device corresponding to the main participant.

2. The virtual assistant negotiation system of claim 1, wherein the first electronic device is configured to orderly transmit the recommended projects to the second electronic device corresponding to the main participant according to a sequence of the recommended projects in order for the main participant to make a determination and provide the input on whether to agree to the recommended projects via the second electronic device corresponding to the main participant.

3. The virtual assistant negotiation system of claim 2, wherein
when the main participant provides the input to oppose the recommended projects via the second electronic device corresponding to the main participant to the first electronic device, the first electronic device re-generates and re-transmits the recommended projects to the second electronic device corresponding to the main participant to make the determination and provide the input on whether to agree to the recommended projects via the second electronic device corresponding to the main participant.

4. The virtual assistant negotiation system of claim 2, wherein
when the main participant provides the input to agree to at least one of the recommended projects via the second electronic device corresponding to the main participant to the first electronic device, the first electronic device selects the recommended project agreed by the second electronic device corresponding to the main participant to serve as a final project.

5. The virtual assistant negotiation system of claim 1, wherein each of the second electronic devices is further configured to generate the candidate projects according to a corresponding personal model and the event information.

6. The virtual assistant negotiation system of claim 1, wherein the first electronic device corresponding to the initiator is further configured to generate the candidate projects, corresponding to the event information, according to a personal model of the initiator and the event information.

7. The virtual assistant negotiation system of claim 5, wherein each of the second electronic devices is further configured to generate the corresponding personal model according to a historical record of the corresponding participant and a record of acceptance, corresponding to the event information.

8. The virtual assistant negotiation system of claim 1, wherein the first electronic device is further configured to calculate a plurality of recommendation scores corresponding to the candidate projects respectively according to the weight corresponding to each of the participants in the event information and an acceptance, corresponding to each candidate project, for each participant.

9. The virtual assistant negotiation system of claim 8, wherein the first electronic device is further configured to sequence the candidate projects according to the recommendation score of each the candidate project and select a predetermined number of the candidate projects with higher recommendation scores in the sequence to serve as the recommended projects.

10. The virtual assistant negotiation system of claim 1, wherein the first electronic device is further configured to orderly transmit the recommended projects to the second electronic device of the main participant according to a sequence of the recommended projects and the weight corresponding to each participant in the event information.

11. A virtual assistant negotiation method, comprising:
transmitting an event information by a first electronic device corresponding to an initiator;
obtaining a plurality of participants corresponding to the event information, a weight corresponding to each of the participants in the event information and a main participant from among the participants according to a group relationship table corresponding to the event information by the first electronic device, wherein the weight corresponding to each of the participants varies with different event information;
receiving a plurality of candidate projects generated by a plurality of second electronic devices, corresponding to the participants, according to the event information;
selecting at least one portion of the candidate projects to serve as recommended projects by the first electronic device; and
making a decision for the recommended projects, by the first electronic device, according to input provided by the second electronic device corresponding to the main participant.

12. The virtual assistant negotiation method of claim 11, wherein the step of making the decision for the recommended projects further comprises:
orderly transmitting the recommended projects to the second electronic device corresponding to the main participant according to a sequence of the recommended projects generated by the first electronic device in order for the main participant to make a determination and provide the input on whether to agree to the recommended projects.

13. The virtual assistant negotiation method of claim 12, wherein the step of making the decision for the recommended projects further comprises:
when the main participant provides the input to oppose the recommended projects via the second electronic device corresponding to the main participant to the first electronic device, the first electronic device re-generating the recommended projects and re-transmitting the recommended projects to the second electronic device corresponding to the main participant according to the sequence of the recommended projects for the main participant to make the determination and provide the input on whether to agree the recommended projects.

14. The virtual assistant negotiation method of claim 12, wherein the step of making the decision for the recommended projects further comprises:

when the main participant provides the input to agree to at least one of the recommended projects via the second electronic device to the first electronic device, selecting the recommended project agreed by the second electronic device corresponding to the main participant by the first electronic device to serve as a final project.

15. The virtual assistant negotiation method of claim 11, further comprising:
generating the candidate projects, corresponding to the event information, of each of the participants according to a corresponding personal model of the participant and the event information by the second electronic device corresponding to the participant.

16. The virtual assistant negotiation method of claim 11, further comprising:
generating the candidate projects of the initiator by the first electronic device, corresponding to the event information, according to a personal model of the initiator and the event information.

17. The virtual assistant negotiation method of claim 15, wherein the step of generating the candidate projects further comprises:
generating the corresponding personal model according to a historical record of the corresponding participant and a record of acceptance, corresponding to the event information, by the second electronic device corresponding to the participant.

18. The virtual assistant negotiation method of claim 11, further comprising:
the first electronic device calculating a plurality of recommendation scores corresponding to the candidate projects respectively according to the weight corresponding to each of the participants in the event information and an acceptance, corresponding to each candidate project, for each participant.

19. The virtual assistant negotiation method of claim 18, wherein the step of selecting at least one portion of the candidate projects to serve as the recommended projects by the first electronic device further comprises:
sequencing the candidate projects according to the recommendation scores of the candidate projects and selecting a predetermined number of the candidate projects with higher recommendation scores in the sequence, by the first electronic device to serve as the recommended projects.

20. The virtual assistant negotiation method of claim 18, further comprising:
orderly transmitting the recommended projects to the second electronic device of the main participant, by the first electronic device, according to a sequence of the recommended projects and the weight corresponding to each participant in the event information.

* * * * *